(12) United States Patent
Porzio Giusto (10) Patent No.: US 9,319,840 B2
(45) Date of Patent: Apr. 19, 2016

(54) METHOD FOR ESTIMATING THE DISTANCE OF A RECEIVER FROM A RADIO TRANSMITTER, RELATIVE METHODS FOR CALCULATING THE POSITION OF A MOBILE TERMINAL, MOBILE TERMINAL AND LOCALIZATION DEVICE

(75) Inventor: Pietro Porzio Giusto, Rome (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 106 days.

(21) Appl. No.: 13/982,997

(22) PCT Filed: Feb. 27, 2012

(86) PCT No.: PCT/IB2012/050900
§ 371 (c)(1),
(2), (4) Date: Jul. 31, 2013

(87) PCT Pub. No.: WO2012/114320
PCT Pub. Date: Aug. 30, 2012

(65) Prior Publication Data
US 2013/0310074 A1 Nov. 21, 2013

(30) Foreign Application Priority Data
Feb. 25, 2011 (IT) .............................. TO2011A0168

(51) Int. Cl.
*H04W 24/00* (2009.01)
*H04W 4/02* (2009.01)
(Continued)

(52) U.S. Cl.
CPC ............... *H04W 4/023* (2013.01); *G01S 11/02* (2013.01); *H04W 64/00* (2013.01)

(58) Field of Classification Search
CPC ..................................................... H04W 64/00
USPC ........... 455/456.1–456.6, 450–455, 464, 509, 455/516, 161.1, 166.1–168.1; 370/302, 370/329, 330, 341, 437, 468
See application file for complete search history.

(56) References Cited
U.S. PATENT DOCUMENTS

| 6,201,499 B1 * | 3/2001 | Hawkes et al. ................ 342/387 |
| 2004/0054471 A1 * | 3/2004 | Bartlett et al. ................ 701/213 |

(Continued)

FOREIGN PATENT DOCUMENTS

| JP | 2002-504664 | 2/2002 |
| JP | 2005-501472 | 1/2005 |

(Continued)

OTHER PUBLICATIONS
International Search Report dated May 22, 2012, issued in PCT/IB2012/050900, filed Feb. 27, 2012.

(Continued)

*Primary Examiner* — Rafael Pérez-Gutiérrez
*Assistant Examiner* — Mark G Pannell
(74) *Attorney, Agent, or Firm* — Workman Nydegger (57) ABSTRACT

A method for estimating the distance (d) of a receiver (102) from a radio transmitter (101) includes the steps of: receiving (602) radio signals (103, 701) irradiated by the transmitter (101), which include components from which at least three tones (1,2,3,4) are extracted, each having a different frequency; measuring (606) a first phase difference ($\Delta\phi_{21}$) between first two tones (1, 2) of the at least three tones, whose frequencies ($f_1$, $f_2$) have a first spacing, and measuring a second phase difference ($\Delta\phi_{43}$) between second two tones (3, 4) of the at least three tones, whose frequencies ($f_3$, $f_4$) have a second spacing, wherein one of the first spacing or second spacing is greater than the other; estimating (607, 611, 613) the distance (d) on the basis of the first phase difference ($\Delta\phi_{21}$) and the second phase difference ($\Delta\phi_{43}$).

9 Claims, 6 Drawing Sheets

(51) Int. Cl.
*G01S 11/02* (2010.01)
*H04W 64/00* (2009.01)

(56) References Cited

U.S. PATENT DOCUMENTS

| | | | |
|---|---|---|---|
| 2007/0001867 A1 | 1/2007 | Rowe et al. | |
| 2008/0291089 A1 | 11/2008 | Seong et al. | |
| 2008/0307025 A1 | 12/2008 | Licul | |
| 2009/0058729 A1* | 3/2009 | Jo | 342/387 |
| 2009/0149202 A1* | 6/2009 | Hill et al. | 455/456.6 |
| 2009/0243932 A1* | 10/2009 | Moshfeghi | 342/378 |
| 2010/0271263 A1* | 10/2010 | Moshfeghi | 342/378 |
| 2010/0279707 A1* | 11/2010 | Fischer et al. | 455/456.1 |
| 2011/0129023 A1* | 6/2011 | Hoffmann et al. | 375/260 |
| 2012/0028652 A1* | 2/2012 | Wirola et al. | 455/456.1 |
| 2012/0122485 A1* | 5/2012 | Bartlett | 455/456.1 |
| 2013/0143595 A1* | 6/2013 | Moshfeghi | 455/456.1 |

FOREIGN PATENT DOCUMENTS

| | | |
|---|---|---|
| JP | 2006-42201 | 2/2006 |
| JP | 2009-74974 | 4/2009 |
| TW | 200942852 | 10/2009 |
| TW | 345641 B | 7/2011 |
| WO | 00/40991 A1 | 7/2000 |
| WO | 2007/067007 A1 | 6/2007 |

OTHER PUBLICATIONS

Written Opinion dated May 22, 2012, issued in PCT/IB2012/050900, filed Feb. 27, 2012.
Taiwanese Office Action and search report dated Dec. 3, 2013, issued in Taiwan Application No. 10221666490, filed Feb. 24, 2012.

* cited by examiner

METHOD FOR ESTIMATING THE DISTANCE OF A RECEIVER FROM A RADIO TRANSMITTER, RELATIVE METHODS FOR CALCULATING THE POSITION OF A MOBILE TERMINAL, MOBILE TERMINAL AND LOCALIZATION DEVICE

TECHNICAL FIELD

The present invention relates to a method for estimating the distance of a radio receiver from a radio transmitter. The present invention also relates to relative methods for calculating the position of a radio mobile terminal, to a mobile terminal, and to a device for localizing a mobile terminal.

The invention is preferably and advantageously applied to receivers and transmitters belonging to a network with OFDM ("Orthogonal Frequency Division Multiplexing") modulation, such as, for example, mobile terminals compliant with the Long Term Evolution (LTE) standard.

PRIOR ART

As known, the position of a mobile terminal can be obtained through trilateration or multilateration techniques, which are based on the knowledge of the relative distance between the mobile terminal and a plurality of points having known coordinates, e.g. geostationary satellites or terrestrial radio base stations.

Knowing the position of the mobile terminal allows access to emergency services, to services based on the position of the mobile terminal (known as LBS, "Location-Based Services"), such as, for example, managing a fleet of vehicles, to services the cost of which depends on the position of the user (the so-called "Location-Based Billing"), to monitoring or security services (e.g. for tracing the position of a stolen vehicle), and to other services as well.

Methods for localizing mobile terminals are known which are based on satellite systems (e.g. Global Positioning System, or GPS) and offer good accuracy in the localization of the mobile terminal, but cannot ensure service within closed buildings or areas with natural or artificial obstacles (e.g. the so-called "urban canyons" between tall buildings), which prevent reception of satellite signals. Moreover, satellite localization systems require relatively long times for establishing the necessary synchronizations before they can provide position estimates.

Localization methods are also known which are based on systems relying on a terrestrial cellular network; these methods offer short response times and indoor coverage, but they are generally less accurate than satellite systems and inadequate for many applications.

One example of a method for localizing a mobile terminal is known from patent application WO2007/067007 and from the corresponding application US2008/0291089A1. It describes a device and a method for determining the position of a radio beacon in motion. In particular, the radio beacon transmits radio signals having "multiple frequencies", which are received by a plurality of radio base stations. According to the method of WO2007/067007, phase differences are assessed between two "frequencies" of the signal sent to each base station. The relative distances between the radio beacon and each base station are computed by a location computing server, which takes into account the assessed phase differences and the time of arrival of the signal at each base station. The position of the radio beacon is thus calculated by trilateration.

However, the method known from WO2007/067007 has a few drawbacks. First of all, for a correct evaluation of the relative distances, the base stations must have clock synchronism to be able to precisely assess the differences between the times required by the signals to cover the respective paths to the base stations.

In addition, the method known from WO2007/067007 allows estimating the relative distances only if the mobile terminal, i.e. the radio beacon, transmits a signal which is correctly received by at least three base stations. This requirements turns out to be disadvantageous for applications in the field of cellular telephony, wherein the mobile terminal typically irradiates a signal intended for a specific radio base station.

Furthermore, radio base stations must be able to communicate with a server adapted to compute the location of the mobile terminal. This requires dedicated connections or occupation of band which could be used otherwise.

In short, the method known from WO2007/067007 is neither efficient nor practical for calculating the relative distances between a mobile terminal and a plurality of base stations. Also, this known solution does not allow a mobile terminal to calculate its own location without making use of a costly communication with a location computing server connected to the base stations. Finally, the method known from WO2007/067007 is sensitive to noise in the signal being transmitted, e.g. due to signal reflections, which may cause errors in the estimated relative distances.

OBJECTS AND SUMMARY OF THE INVENTION

The present invention aims at providing a method for estimating the distance of a receiver from a radio transmitter, which overcomes some drawbacks of the prior art.

In particular, it is one object of the present invention to provide a method which allows estimating the distance of a receiver from a transmitter in a fast and immediate manner, without needing any further communications with other remote devices. It is another object of the present invention to provide a method which allows estimating said distance with a high level of accuracy.

It is a further object of the present invention to provide a method which allows correcting any errors caused by signal noise, e.g. noise due to signal reflections on multiple propagation paths.

These and other objects of the present invention are achieved through a method for estimating the distance of a receiver from a radio transmitter, through related methods for localizing a mobile terminal, and through a mobile terminal and a localization device incorporating the features set out in the appended claims, which are intended as an integral part of the present description.

The general idea at the basis of the present invention is to use a radio receiver receiving radio signals irradiated by a transmitter, and to calculate the relative distance between them based on the received signals. The signals comprise components from which the receiver extracts at least three tones, each having a different frequency. The receiver measures a first phase difference between a first pair of tones, and a second phase difference between a second pair of tones, different from the first one, in particular in a manner such that the frequency spacing of either one of the first and second pairs of tones is greater than the other. The distance between the receiver and the transmitter is then estimated on the basis of the phase differences measured at receiver level.

By so doing, the distance can be estimated in a fast and immediate manner; in addition, it is the receiver itself that performs the measurements required for the estimate, so that no further communications with the transmitter or with other remote devices are necessary. Advantageously, the receiver needs not emit any radio signals.

In this way, it is also possible to estimate the distance between the receiver and the transmitter with better accuracy, because the increased frequency spacing between the tones increases the spatial resolution corresponding to spatial variations in the phase difference. It follows that, with the same uncertainty of the phase difference measurement taken at receiver level, the estimated distance is more accurate as spacing increases. Preferably, the distance between the receiver and the transmitter is estimated by making a comparison between a first distance estimate based on the first phase difference and at least one second distance estimate based on the second phase difference. Thus, the distance estimate obtained from tones having a smaller frequency spacing allows solving any ambiguities due to possible spatial periodicities of the evaluated phase differences. The other distance estimate obtained from tones having a greater frequency spacing is more accurate, and therefore allows improving the precision of the estimated distance.

The invention is advantageously applicable to OFDM modulation systems, wherein the signals transmitted by the transmitters, e.g. base stations, contain a multiplicity of sub-carriers equally spaced in frequency from which the receiver, e.g. mobile cellular terminals, can extract a multiplicity of tones. By appropriately selecting the tones of the subcarriers from the OFDM signal, the method of the present invention allows measuring phase differences between tones having various frequency spacings and chosen in a manner such as to obtain, for wide spacings, highly accurate distance estimates while at the same time removing, for small spacings, any ambiguities deriving from the spatial periodicity of the phase differences.

In the case of OFDM signals with subcarriers equally spaced in frequency, preferably the spacing of the tones having the smaller spacing between the two pairs is equal to the spacing between the subcarriers of the OFDM signal. In fact, this spacing advantageously is the minimum available spacing between the signal tones, corresponding to the maximum spatial periodicity of the phase difference. In this manner, it is even possible to estimate long distances between receiver and transmitter. In general, it is advantageous to select a pair of tones having minimal spacing also for signals comprising tones not equally spaced in frequency.

Preferably, the signal tones are selected among those having the best signal-to-noise ratio within the signal, i.e. a signal-to-noise ratio higher than a predetermined threshold value. This allows improving the phase difference measurement, hence further improving the accuracy of the distance estimate. Preferably, the tones having greater spacing are selected depending on the measurements uncertainty associated with the phase difference between tones having smaller spacing, so as to adequately improve the distance estimate and to suit the existing operating conditions. For example, the tones can be selected also on the basis of an accuracy target of the distance estimate.

By measuring phase differences between pairs of tones having different frequencies, the present method allows obtaining parameters useful for correcting any distance estimate errors caused, for example, by signal reflections. In fact, the analysis of the transfer function of the tones of a radio channel allows correcting the estimated distance even in the presence of signal reflections generating multiple propagation paths. Advantageously, this allows obtaining more accurate distance estimates, which are also less affected by noise due to signal reflections. To make this correction, the method preferably provides for evaluating the ratio between the amplitude of a direct signal and the amplitude of a reflected signal on one of the multiple propagation paths, and then evaluating the delay of the reflected signal with respect to the direct signal. This amplitude ratio can be calculated by assessing the half-amplitude of the periodic variations of the frequency spectrum of the signal received by the receiver, while the delay is calculated by assessing the periodicity interval of the periodic variations of the frequency spectrum of the received signal. Preferably, said amplitude ratio and said delay are calculated by measuring a plurality of phase differences of a plurality of tone pairs in the received signal, wherein said plurality of pairs have different respective frequencies but the same frequency spacing.

In one embodiment, the method subsequently reiterates the phase differences between tone pairs, which at each reiteration are selected with different, in particular increasing, frequency spacings. In this way, the accuracy of the distance estimate can be further improved by means of subsequent measurements.

According to a further aspect, the present invention relates to methods for calculating the position of a mobile terminal. In addition, according to yet another aspect, the present invention relates to mobile terminals and to a device for localizing mobile terminals related to said methods.

Further objects and advantages of the present invention will become more apparent from the following description of a few embodiments thereof, which are supplied by way of non-limiting example.

BRIEF DESCRIPTION OF THE DRAWINGS

Some preferred and advantageous embodiments will now be described by way of non-limiting example with reference to the annexed drawings, wherein:

FIG. 9A schematically shows a spectrum of a signal of an LTE cellular network transmitted or received with no distortion, whereas

DETAILED DESCRIPTION OF THE INVENTION

In the present description, the term "tone" refers to a sinusoidal signal having amplitude A, phase $\phi$ and frequency f. The radio signals are transmitted by "modulation". In particular, the electromagnetic signal containing information is said to be "modulating", and is impressed (i.e. modulated) on a tone; the signal thus modulated takes the name of "carrier", or "subcarrier" if there is a subsequent frequency translation through another tone. The higher frequency translation is used for making the modulated signal suitable for irradiation by an antenna. At receiver level, the signal received by the antenna can be demodulated to isolate its components. In this manner, from a carrier it is possible to extract at least one respective tone.

Furthermore, in the present description the terms "receiver" and "transmitter" refer to devices adapted to transmit and receive radio signals, wherein the estimated distance is essentially the distance (in space, or approximated in the plane) that separates the antenna of the receiver from the antenna of the transmitter.

Finally, the term "spacing" between two frequencies refers to the module of the difference between the two frequencies, i.e. the higher frequency minus the lower frequency.

Figure 1:
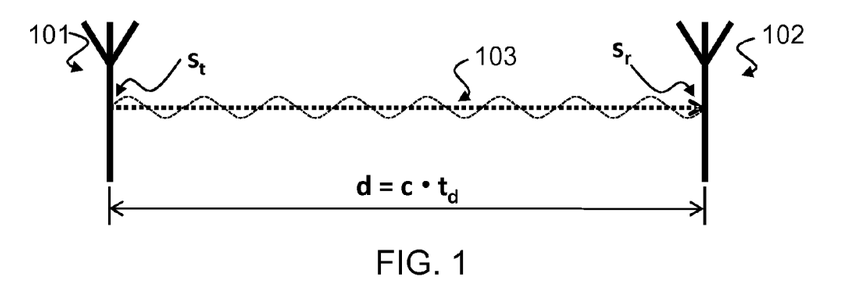
FIG. 1 shows the propagation of a signal between a transmitter and a receiver.

FIG. 1 diagrammatically illustrates the transmission of a radio signal 103 from a transmitter 101 to a receiver 102, which are schematically shown by means of the respective antennas.

The signal 103 travels the distance d that separates the antennas of the transmitter 101 and of the receiver 102, propagating in the air at a speed essentially equal to the speed of light c, and taking a travel time $t_d$ to cover the distance d; it follows that:

$$d = c \cdot t_d$$

where:
c is the speed of propagation of electromagnetic waves in the air, which can be assumed to be equal to the speed of light in vacuum, i.e. approx. $3 \cdot 10^8$ m/s.
$t_d$ is the time taken by the electromagnetic waves to travel the distance d.

The signal 103 comprises at least one tone, which for simplicity is assumed to have unitary amplitude and null initial phase. The tone $s_t$ emitted by the transmitter 101 can therefore be represented as a simple sinusoidal function expressed by:

$$s_t = \sin(2\pi f t)$$

where:
f is the frequency of the tone $s_t$ of the signal 103,
t is time.

For the purposes of the method of the present invention, the amplitude attenuation undergone by the signal 103 during propagation is unimportant; therefore, for simplicity, in the present description it will be assumed to be absent.

At a distance d from the antenna of the transmitter 101, the signal 103 is received by the antenna of the receiver 102; the received tone $s_r$ of the signal 103 can be represented as:

$$s_r = \sin[2\pi f(t - t_d)]$$

therefore, the tone $s_r$ has a delay $t_d$ with respect to the tone $s_t$, which is due to the travel time spent by the signal 103 to travel the distance d.

The tone $s_r$ received by the receiver 102 can also be expressed as follows:

$$s_r = \sin(2\pi f t - \phi_d)$$

which expresses the phase $\phi_d$ that depends on the delay $t_d$:

$$\phi_d = 2\pi f d / c$$

Figure 2A:
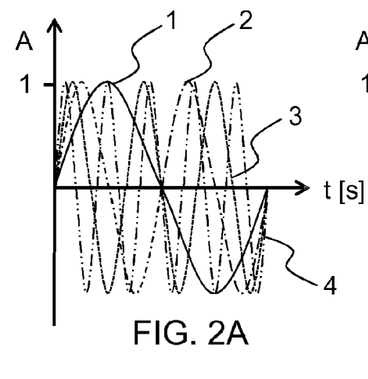
FIGS. 2A and 2B show an example of a signal comprising four tones, represented in the time domain (FIG. 2A) and in the frequency domain (FIG. 2B).
Figure 2B:
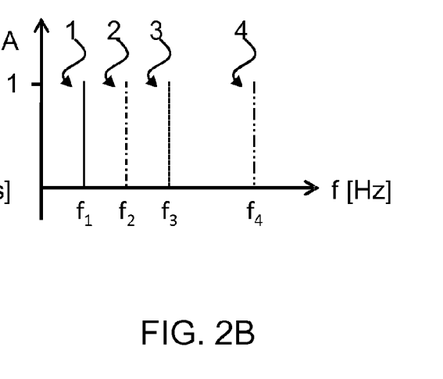

FIGS. 2A and 2B illustrate an example of a signal 103 which can be used in accordance with the teachings of the present invention. The signal 103 comprises four tones 1, 2, 3 and 4, represented in both the time domain (FIG. 2A) and the frequency domain (FIG. 2B), having respective frequencies $f_1$, $f_2$, $f_3$, $f_4$, distinct from one another, and arbitrary amplitudes A.

The tones 1, 2, 3 and 4 have known mutual phase differences at the output of the transmitter 101, which, for simplicity, in the present description will be assumed to be equal to zero at time t=0. It must be pointed out that such initial phase differences, i.e. at the output of the transmitter 101, are easily made known to the receiver 102. In fact, this is common practice for radio transmissions, e.g. cellular ones.

Initially, two tones of the signal 103 are taken into consideration, e.g. tone 1 and tone 2, the latter having a higher frequency than tone 1, i.e. $f_2 > f_1$.

At instant $t = t_d$, i.e. the instant at which the signal 103 is received by the receiver 102 located at a distance d from the transmitter 101, the phase difference $\Delta\phi_{22}$ between tone 1, with frequency $f_1$, and tone 2, with frequency $f_2$, is given by:

$$\Delta\phi_{21} = \phi_2 - \phi_1$$

which is equal to:

$$\Delta\phi_{21} = [2\pi(f_2 - f_1)/c] \cdot d$$

that is, the phase difference $\Delta\phi_{21}$ is directly proportional to the spacing between the frequencies $f_1$ of tone 1 and $f_2$ of tone 2, and directly proportional to the distance d from the transmitter 101 that the signal 103 travels to arrive at the receiver 102.

Figure 3:
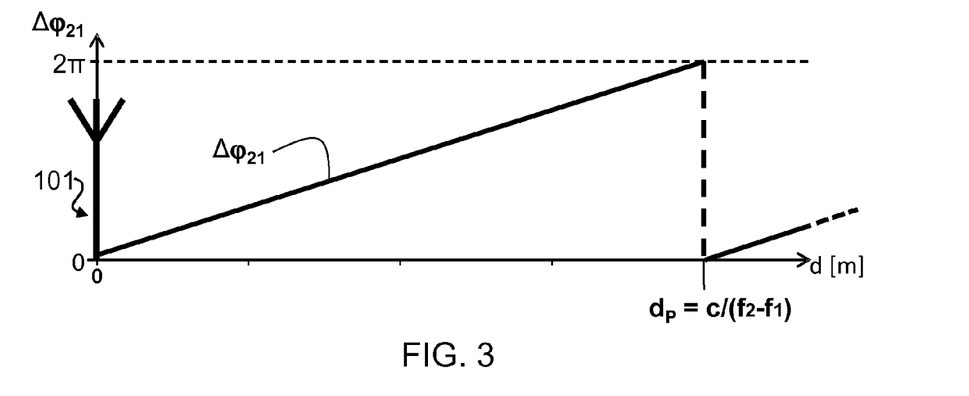
FIG. 3 shows the trend of the phase difference between two tones of a signal as a function of the distance travelled by the signal.

FIG. 3 exemplifies the trend of the phase difference $\Delta\phi_{21}$ between the phases of the two tones 1 and 2 as a function of the distance d from the transmitter 101 travelled by the signal 103. The phase difference $\Delta\phi_{21}$ grows linearly as the distance d increases, from a value which is known to both the receiver and the transmitter (zero in this example) to a value equal to said value plus twice pi radians (in this example, $2\pi$ rad, i.e. 360°).

When the phase difference $\Delta\phi_{21}$ reaches the value of $2\pi$ rad, its value becomes again equal to the value it had at a null distance from the transmitter 101. The trend of $\Delta\phi_{21}$ is repeated periodically in space, with a period equal to the distance $d_P$, i.e. equal to the ratio between the speed c and the spacing between the frequencies $f_1$ and $f_2$:

$$d_P = c/(f_2 - f_1)$$

By knowing the phase difference $\Delta\phi_{21}$ between two tones of a signal 103 received by a receiver 102, whose frequencies and initial phases are known, it is possible to calculate the distance d that separates the transmitter 101 from the receiver 102, provided that this distance is shorter than the periodicity distance $d_P$ of the phase difference itself.

From the above, in fact, one obtains direct proportionality between the distance d and the phase difference $\Delta\phi_{21}$ measured by the receiver 102 between the two tones 1 and 2:

$$d=\Delta\phi_{21}c/[2\pi(f_2-f_1)]$$

Figure 4:
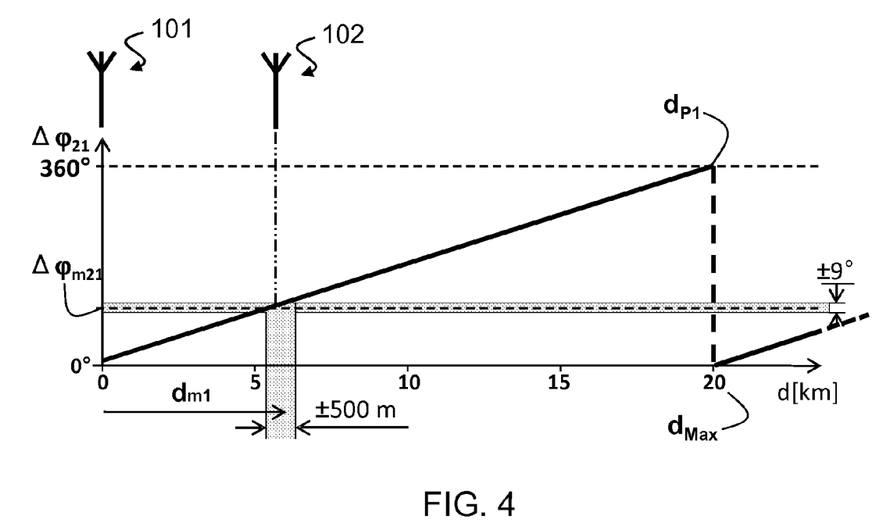
FIG. 4 shows the trend of the phase difference between the tones of two subcarriers of an OFDM signal spaced by 15 kHz as a function of the distance travelled by the signal.

With reference to FIG. 4, let us now consider, by way of non-limiting example, an OFDM signal such as, for example, the one transmitted by a radio base station 101 of an LTE cellular network. In this exemplary case, the receiving terminal 102 is an LTE mobile terminal, i.e. a user apparatus adapted to connect to the network.

From the OFDM signals a plurality of tones can be extracted. In fact, OFDM signals carry information through a plurality of "subcarriers" with close frequencies. Each subcarrier is modulated according to patterns that alter the amplitude and phase of its waveform. However, in order to demodulate the OFDM signal, i.e. to compare the waveforms of the modulated subcarriers with the corresponding tones (not modulated), receivers "extract" the plurality of tones corresponding to the subcarriers of the signal by means of a suitable extraction circuit. Therefore, the plurality of subcarriers of a signal with OFDM modulation corresponds to a plurality of tones as previously described.

In one embodiment, the OFDM signal of an LTE cellular network comprises a plurality of subcarriers equally spaced by 15 kHz, in a number depending on the band of the radio channel. In particular, the radio channel is typically 5 MHz wide, and there are 300 subcarriers that occupy 4.5 MHz of band, while 250 kHz per side are left unoccupied in order to promote decoupling between adjacent channels.

An OFDM signal like the one described above allows extracting one separate tone for each subcarrier, and can therefore be used for estimating the distance between a transmitter (e.g. an LTE radio base station) and a receiver (e.g. an LTE mobile terminal) in accordance with the method of the present invention.

By considering as reference tones those extracted from two adjacent subcarriers of the OFDM signal, whose frequency spacing is 15 kHz:

$$f_2-f_1=15\text{ kHz}$$

one obtains a trend of the phase difference $\Delta\phi_{21}$ between the tones of the two OFDM subcarriers as shown in FIG. 4, which increase linearly as a function of the distance d from the transmitter 101. In particular, as aforementioned, as the distance d increases from zero to a periodicity distance $d_{P1}$, the phase difference $\Delta\phi_{21}$ grows linearly from zero to 360°. Past the distance $d_{P1}$, the phase difference $\Delta\phi_{21}$ is repeated with a periodic saw-tooth trend, with a period of $d_{P1}$. In the present example, $d_{P1}$ as calculated with the above formula is approx. 20 km.

In the example taken into account, relating to an OFDM signal of an LTE network, one can thus correlate the phase difference $\Delta\phi_{21}$ between the tones of two adjacent subcarriers with the distance d between the transmitter 101 and the receiver 102, provided that the latter is within the distance $d_{P1}$, i.e. within approx. 20 km from the transmitter 101. The coverage range of the cells of the currently available OFDM systems, e.g. LTE or WiMax, is generally much shorter than the periodicity distance $d_{P1}$. The proper operation of the method is thus ensured with a good safety margin for the systems currently in use as well as for any systems that may potentially be conceived in the near future.

In general, no ambiguity problems can arise due to the periodicity of the phase difference $\Delta\phi_{21}$, if the frequencies $f_1$ and $f_2$ of the pair of tones taken into account have a sufficiently narrow spacing, such as to determine a spatial periodicity $d_P$ greater than or equal to the maximum coverage $d_{Max}$, which corresponds to the maximum distance at which the receiver 102 can receive radio signals from the transmitter 101.

Still with reference to FIG. 4, there is exemplified a phase difference $\Delta\phi_{m21}$ measured between the tones 1 and 2 of the OFDM signal at the level of the receiver 102. The measured phase difference $\Delta\phi_{m21}$ has in this example a value of approx. 105°, with which a measurement uncertainty of ±9° is associated. This uncertainty derives from statistical considerations about the measurement taken, which is influenced by possible intrinsic inaccuracies of the system of measurement. It is therefore not possible to measure the "actual" value of the phase difference, since any measurement will always be accompanied by a respective uncertainty.

The estimated distance $d_{m1}$ between the transmitter 101 and the receiver 102, estimated in accordance with the above description with reference to FIGS. 2A, 2B and 3, corresponds to approx. 5,840 m, with an accuracy of approx. ±500 m (which derives from the above-mentioned uncertainty). As previously described, the distance $d_{m1}$ is estimated without incurring in any ambiguity due to the periodicity of the phase difference $\Delta\phi_{21}$ taken in consideration.

Since, in general, the uncertainty in the measurement of a phase difference between two tones cannot be easily improved, the present invention improves the accuracy of the distance estimate by measuring a second phase difference.

Figure 5:
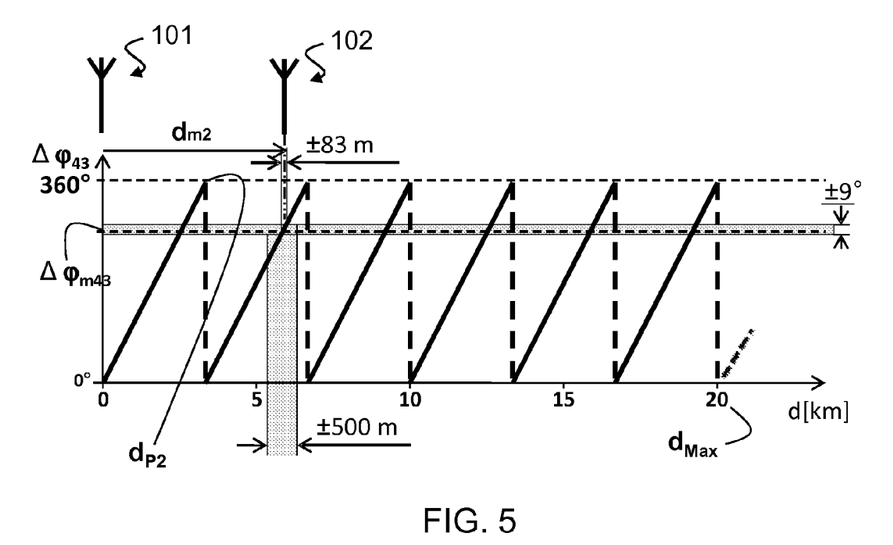
FIG. 5 shows the trend of the phase difference between the tones of two subcarriers of an OFDM signal spaced by 90 kHz as a function of the distance travelled by the signal.

With reference to FIG. 5, there is shown the trend of the phase difference $\Delta\phi_{43}$ between a second pair of tones, having respective frequencies $f_3$ and $f_4$, of two subcarriers 3 and 4 of the same LTE OFDM signal previously taken into account when referring to FIG. 4.

In an advantageous embodiment, only one of the frequencies $f_3$ or $f_4$ coincides with one of the frequencies $f_1$ or $f_2$ already considered at the previous step, e.g. the frequency $f_3$ of FIG. 2B may coincide with the frequency $f_1$. In this manner it is possible to reduce the computational load for the analysis of the OFDM signals received by the receiver.

According to the method of the present invention, the spacing between the frequencies $f_3$ and $f_4$ of the tones 3 and 4 taken into account for measuring the second phase difference $\Delta\phi_{43}$ is greater than the spacing between the frequencies $f_1$ and $f_2$ of the tones 1 and 2 taken into account for measuring the first phase difference $\Delta\phi_{21}$.

In order to measure the second phase difference $\Delta\phi_{43}$, this example uses the tones of two non-adjacent subcarriers of the OFDM signal, whose frequency spacing is a multiple of the previous one, in particular it is equal to 90 kHz:

$$f_4-f_3=90\text{ kHz}$$

The trend of the phase difference $\Delta\phi_{43}$ shown in FIG. 5 is thus obtained, which is a function of the distance d from the transmitter 101.

It is understood that the value of 90 kHz selected for the spacing of the tones 3 and 4 is merely exemplificative; some criteria for choosing the subsequent value will be exemplified below.

As previously described, the trend of the phase difference $\Delta\phi_{43}$ is also periodic and saw-toothed, but in this case there is a periodicity distance $d_{p2}$ shorter than $d_{p1}$ and equal to approx. 3333 m (3·10$^8$/90000 m, still calculated with the above formula for $d_P$).

When measuring the phase difference $\Delta\phi_{43}$ between the tones 3 and 4 of the two subcarriers taken into account, there is still ambiguity in the distance estimate, which is due to the periodicity of the phase difference $\Delta\phi_{43}$. The estimated distance $d_{m2}$ between the transmitter 101 and the receiver 102, in fact, is obtained at less than a constant, i.e. $d_{m2}$=2507+NN 3333 [m], where NN is an integer number greater than or equal to zero, which multiplies the periodicity distance $d_{P2}$. Therefore, the distance $d_{m2}$ estimated from the measured phase difference $\Delta\phi m_{43}$ may, for example, be equal to 2507 m, 5840 m, 9173 m, 12506 m and so forth.

However, since it has already been established, by measuring the phase difference $\Delta\phi_{21}$, that the distance $d_{m1}$ of the antenna of the receiver 102 is 5840±500 m, i.e. with a distance uncertainty which is less than the periodicity interval of the phase difference $\Delta\phi_{43}$, it is possible to resolve the ambiguity of the estimate $d_{m2}$ and select its correct range of values, in this case the one centred around 5840 m.

Therefore, the uncertainty in the measurement of the phase difference $\Delta\phi_{43}$ being equal, e.g. ±9°, just as in the case of $\Delta\phi_{21}$, the method allows reducing the uncertainty associated with the estimate of the distance d thanks to the greater local gradient of the function representing the phase difference $\Delta\phi_{43}$. In this example, in fact, the uncertainty of the distance estimate $d_{m2}$ corresponds to only ±83 m.

As a consequence, the second distance estimate $d_{m2}$ made by assessing a phase difference $\Delta\phi_{m43}$ between the tones 3 and 4 of two subcarriers having a frequency spacing greater than the tones 1 and 2 of the subcarriers of the first phase difference measurement $\Delta\phi_{m21}$ is improved through the comparison with the distance estimate $d_{m1}$.

By comparing said separately obtained estimates $d_{m1}$ and $d_{m2}$, and the respective uncertainties, one arrives at a final distance estimate $d_{mf}$ equal to 5840±83 m.

In general, by starting from a phase difference measurement without any ambiguity caused by phase difference periodicity, and then proceeding with a plurality of subsequent phase difference measurements on tone pairs having increasing frequency spacings, by using appropriate increments to resolve at each step the ambiguities due to phase difference periodicity, the present method allows improving the accuracy of the distance estimate, thus reducing the uncertainty thereof.

It must be pointed out that the sequentiality of the steps described with reference to the previous example is to be considered merely illustrative to allow for easier comprehension of the method. In fact, the various tones may be extracted simultaneously from the signal, or they may be extracted from the signal at different instants. In general, the result of the distance estimate in accordance with the present method is independent of the order in which the "first" and "second" phase differences between the "extracted" tone pairs are measured; one may therefore conceive variants of the method wherein phase difference measurements and distance estimates are made in different successions, possibly less advantageous than the example provided herein.

In the example considered herein, which takes into account LTE OFDM signals with 5 MHz radio channels, the frequency spacing between the tones of the extreme subcarriers is 4.585 MHz. However, in some symbols of an LTE signal there are particular "reference" subcarriers or "reference signals", which are used for determining the phase references for signal demodulation and for estimating the channel transfer function. The tones of these reference subcarriers can be extracted and evaluated with better accuracy compared to tones of other subcarriers of the signal. It is therefore advantageous to use, whenever possible, at least one tone of one of these reference subcarriers.

In one example, the tones of the reference subcarriers of an LTE signal are frequency spaced by multiples of 90 kHz, and the maximum frequency spacing between the tones of the reference subcarriers in the signal is equal to 4.410 MHz, i.e. slightly less than the spacing between the tones of the extreme subcarriers of the signal.

Considering this maximum frequency spacing of 4.410 MHz between the tones and assuming, for example, an accuracy of ±9° of the phase difference measurement, just like before, the accuracy of the distance estimate will be equal to ±1.7 m.

Therefore, the present invention allows obtaining an accuracy of the distance estimate which is comparable to the accuracy obtainable with satellite localization systems, and which is generally better than that of the methods based on cellular networks.

Moreover, considering that an LTE cellular network can use 64QAM modulation, wherein the distance between the states closest in phase is approx. 4.5°, it can be assumed that the uncertainty of the phase difference measurement can be reduced to as low as 4.5°. By using the method of the present invention, this corresponds to an accuracy of the estimate of the distance from the transmitter of approx. ±0.85 m. This localization accuracy is suitable for use in most practical applications related to services based on the position of a mobile terminal of a cellular network, such as an LTE network.

Furthermore, the LTE specifications state that 20 MHz-wide radio channels will be used in the future, with a number of subcarriers four times the one considered so far herein. In such a case, the uncertainty of the phase difference measurement being equal, the accuracy of the distance estimate will be further improved. Considering the frequencies of the extreme reference subcarriers, i.e. having the same spacing, by keeping the uncertainty of the phase difference measurement at 4.5° we will obtain an accuracy of the final distance estimate of approx. ±0.21 m.

It must be pointed out once more that, for simplicity, the measurements of the various phase differences have been exposed herein according to a time sequence by referring to a "first" and a "second" phase differences; however, in general, and even more so in the particular case of OFDM signals, said phase difference measurements may also be taken simultaneously or according to various sequences. In fact, in an OFDM signal all the subcarriers from which the respective tones are extracted are present at the same time. Then the tones are extracted, the phase differences are measured, and the distances are compared at instants which essentially depend on the required storage and computing times.

Figure 6:
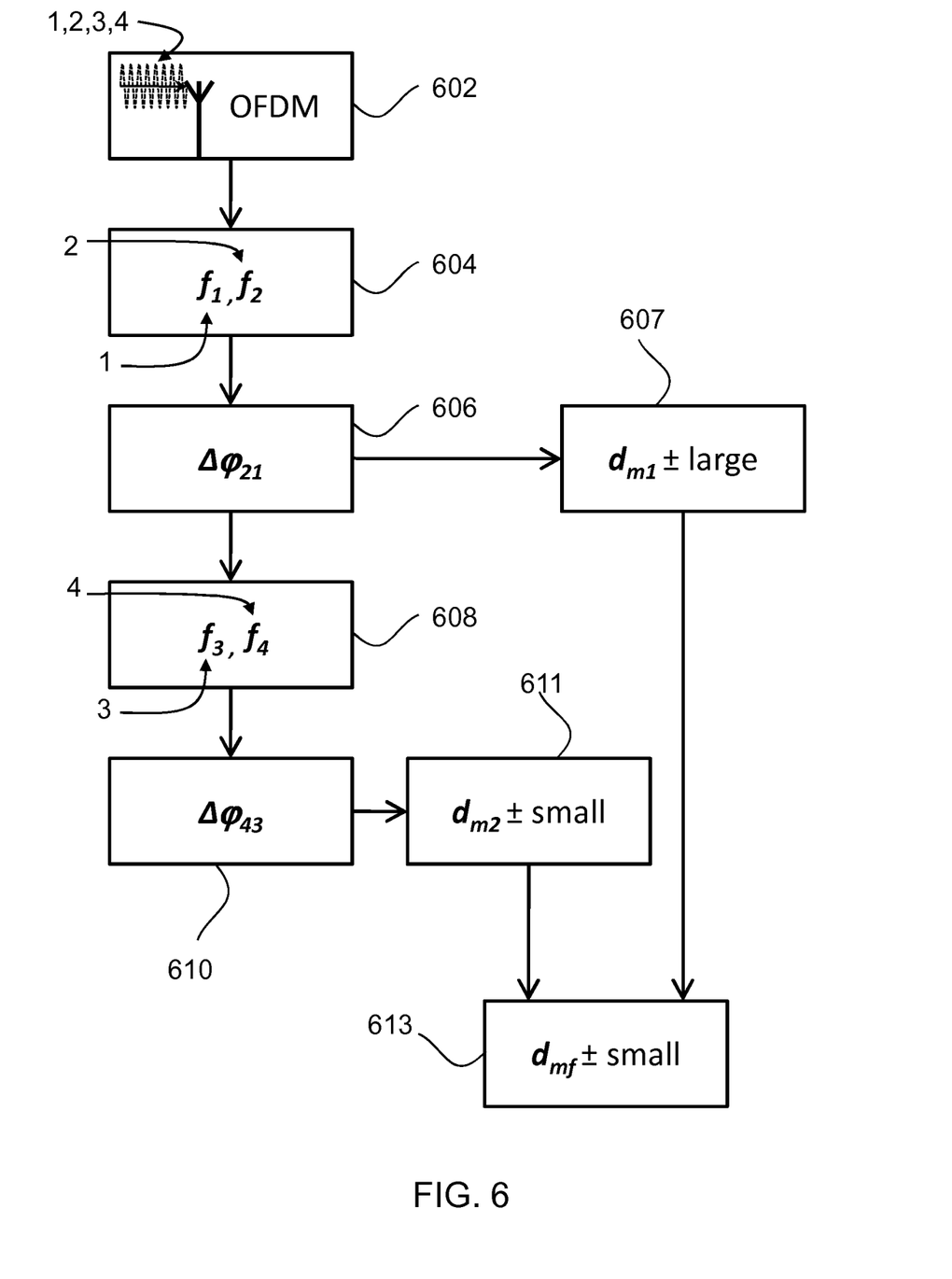
FIG. 6 shows a flow chart exemplifying the method according to the present invention.

With reference to FIG. 6, a flow chart will now be described which exemplifies a particularly advantageous and non-limiting example of the method of the present invention.

According to the method, a receiver receives 602 a signal comprising at least three tones, preferably extracted from subcarriers in an OFDM signal.

Subsequently, there is a selection 604 of a first pair of tones 1 and 2 having frequencies $f_1$ and $f_2$ in accordance with a predetermined criterion. In fact, in the case of OFDM signals the number of subcarriers is very large, and it is important to define a selection criterion.

In a preferred embodiment, the subcarriers from which the tones at frequencies $f_1$ and $f_2$ are extracted are chosen among those having the smallest spacing among all possible tone pairs, so as to maximize the distance $d_P$ from the transmitter 101 within which no ambiguity arises due to the periodicity of the phase difference that will be measured afterwards at step 606. Preferably, if there are a plurality of equally spaced subcarriers, the selected subcarrier pair will be the one with the best signal-to-noise ratio, i.e. the one that will allow reducing the phase measurement uncertainty. In general, it is also conceivable that the selected subcarrier pair must have a signal-to-noise ratio higher than a threshold value.

It must be reminded that, in general, the selected subcarriers have known amplitude and initial phase.

The frequencies $f_1$ and $f_2$ of the tones 1 and 2, i.e. the respective subcarriers, can be selected by additionally taking into account the maximum range $d_{Max}$ beyond which the presence of a transmitter can be ignored. In radio systems wherein the maximum range $d_{Max}$ is much less than the periodicity distance $d_P$ determined by the frequency spacing of the selected tones having minimal spacing, depending on the performance to be achieved by implementing the method one could select a spacing which is a multiple of the minimum spacing between the subcarriers while still not incurring in any ambiguity due to phase difference periodicity. In such a case, a more relaxed constraint can be imposed, by way of example, on the spacing of the frequencies $f_1$ and $f_2$, according to which:

$$f_2 - f_1 \leq c/d_{Max}$$

where:

$f_2$ and $f_1$ [Hz], with $f_2 > f_1$, are the frequencies of the tones to be selected;

$d_{Max}$ [m] is the maximum distance beyond which the presence of any transmitters can be ignored; this distance may, for example, be determined by considerations about signal attenuation;

c [m/s] is the speed of propagation of electromagnetic waves in the air.

The method then provides for measuring 606 a first phase difference $\Delta\phi_{21}$ between the phases of the tones having frequencies $f_1$ and $f_2$, as previously described with reference to FIG. 4.

By measuring, at step 606, the phase difference $\Delta\phi_{23}$, one can estimate, at step 607, a distance $d_{m1}$ from the transmitter to the receiver with an associated phase uncertainty, which translates into inaccuracy of the estimated distance, the extent of which is designated as "large" in the figure.

The method then comprises the step of selecting 608 a second pair of tones 3 and 4 having frequencies $f_3$ and $f_4$. The spacing between them must necessarily be greater than that between the frequencies $f_1$ and $f_2$ of the tones previously considered, so that the accuracy of the distance estimate can be improved; this condition can therefore be expressed as:

$$f_4 - f_3 > f_2 - f_1$$

In order to avoid excessive processing loads, it is appropriate to define criteria for the selection 608 of the subcarriers from which the tones are extracted. The criteria indicated below by way of example may be used individually or in combination.

A first criterion establishes that the subcarriers must be selected among the reference subcarriers of the OFDM signal. In fact, the phases of the tones extracted from these reference subcarriers can be more easily measured with greater accuracy.

A second criterion establishes that an a priori estimate of the uncertainty of the phase difference measurement must be considered (e.g. at step 610 described below), so as to select the maximum spacing between the frequencies $f_3$ and $f_4$ of the tones, in a manner such that the phase difference ambiguity can be removed, by taking into account the uncertainty of the measurement 606 carried out when considering the tones 1 and 2 at the frequencies $f_1$ and $f_2$.

Indicating with $\Gamma(\Delta\phi_{21})$ the uncertainty of the measurement of the phase difference $\Delta\phi_{21}$ between the tones 1 and 2, this criterion is equivalent to selecting the spacing between the frequencies $f_3$ and $f_4$ in such a manner that the ratio between the frequency spacing ($f_4 - f_3$) of the tones 3 and 4 to be selected at step 608 and the frequency spacing ($f_2 - f_1$) between the tones selected at step 604 is smaller than the ratio, from which 1 is subtracted, between the straight angle ($\pi$ [rad] or 180°) and the maximum phase variation $\Gamma(\Delta\phi_{21})$ due to the uncertainty in the measurement of the preceding phase difference $\Delta\phi_{21}$. Said criterion can also be expressed by the following disequation:

$$(f_4-f_3)/(f_2-f_1) < (\pi/\Gamma(\Delta\phi_{21})-1)$$

In the previous example, shown with reference to FIGS. 4 and 5, the phase difference measurement was $\Delta\phi_{21} = 105° \pm 9°$, so that $\Gamma(\Delta\phi_{21}) = 9° \approx 0.16$ rad. Of course, further suitable safety factors may be introduced in the formula, depending on the characteristics of the practical implementation of the method.

Finally, one may use a criterion for limiting the maximum spacing between the frequencies of the tones of the subcarriers to be selected, considering the final accuracy $\Delta d$ with which one wants to estimate the distance d, i.e. to estimate $d \pm \Delta d$.

In particular, the final frequency spacing ($f_4 - f_3$) is selected in a manner such that it is greater than the ratio, multiplied by the speed of propagation c, between the peak uncertainty of the phase measurement $\Gamma(\Delta\phi_{23})$ (estimated or known a priori) and the product of the straight angle ($2\pi$ rad) by the final peak accuracy $\Delta d$ with which one wants to calculate the distance d, i.e.:

$$(f_4-f_3) > (c \cdot \Gamma(\Delta\phi_{21})/(2\pi \cdot \Delta d))$$

Once the selection 608 of the frequencies $f_3$ and $f_4$ of the second tone pairs has been made, a measurement 610 is taken of a second phase difference $\Delta\phi_{43}$ between the phases of the tones 3 and 4 having frequencies $f_3$ and $f_4$, as previously described with reference to FIG. 5.

By measuring the phase difference $\Delta\phi_{43}$, it is possible to estimate 611 an estimated distance $d_{m2}$ from the transmitter 101 to the receiver 102. The measurement of the phase difference $\Delta\phi_{43}$ is associated with an uncertainty, designated as "small" in the figure, of the estimate of the distance $d_{m2}$, which uncertainty is less than that of the distance $d_{m1}$, designated as "large".

As already described, any ambiguity due to the fact that the distance $d_{m2}$ is determined at less than the phase difference periodicity is resolved by considering and comparing the previous estimate 607 of the distance $d_{m1}$. A single compatible solution is thus found, and the distance $d_{mf}$ is estimated 613 as previously described with reference to FIG. 5.

In this example, the final estimated distance $d_{mf}$ will be associated with the same "small" uncertainty as the estimated distance $d_{m2}$, thereby improving the accuracy of the estimate. In general, the uncertainty associated with the final estimated distance $d_{mf}$ will at any rate be less than the "large" uncertainty associated with the first distance estimate $d_{m1}$.

In an alternative embodiment, it is conceivable that the method goes on iteratively by selecting subsequent tone pairs with progressively increasing frequency spacing, according to criteria already defined with reference to step 608. This improves the accuracy of the distance estimate, until reaching a limit where the extreme subcarriers are considered (giving the best distance resolution) or until reaching a predetermined distance estimate accuracy that allows the distance estimate to be used for the desired localization services.

It must be reminded that, since all subcarriers are present at the same time in the OFDM signal, the various phase differences between the tones can be calculated simultaneously or at different instants according to different sequences, even less advantageous that those exemplified herein. Furthermore, having available a plurality of tones from the OFDM subcarriers, one can take redundant measurements of phase differences between tones, and then use the results to select those measurements that allow improving the accuracy of the distance estimate, while at the same time obtaining additional parameters indicating the reliability of the estimate. For example, it is possible to calculate mean values, whether weighted or not, standard deviations and other statistical quantities with which the results can be characterized.

Figure 7:
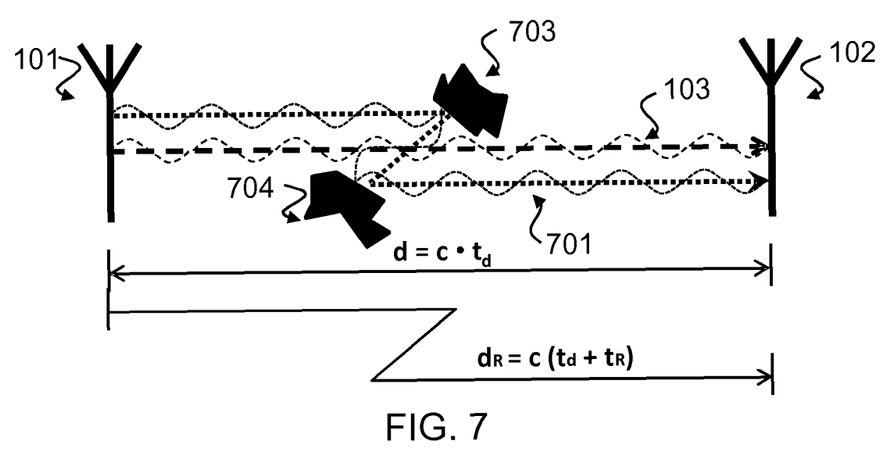
FIG. 7 shows the propagation of a signal between a transmitter and a receiver in the presence of obstacles that produce signal reflections.

FIG. 7 shows the propagation of two signals 701 and 103 from the transmitter 101 to the receiver 102. The signal 103 is the same signal already described with reference to FIG. 1, which travels along a direct propagation path. On the other hand, the signal 701 meets along its path obstacles 703 and 704, such as, for example, walls, rises or other large surfaces.

The obstacles 703 and 704 cause the signal 701 to be reflected, thereby lengthening the path it travels to reach the receiver 102 and introducing phase rotation into its spectral components. These multiple propagation paths may bring about interferences at the various frequencies of the signal received by the receiver 102, due to the combination of the direct signal 103 and the reflected signal 701.

In addition, since the reflections of the signal 701 lengthen the path thereof, the distance $d_R$ covered by the signal 701 will be longer than the distance d that separates the receiver 102 from the transmitter 101. Accordingly, the time taken by the signal 701 for travelling the path will be increased by a delay $t_R$ compared to the travel time $t_d$ of the direct signal 103. The parameters $d_R$, $t_d$, and $t_R$ are bound by the following relation:

$$d_R = c(t_d + t_R)$$

These phase displacements and delays of the signal 701, caused by multiple propagation paths, adversely affect the accuracy of the distance estimate according to the present invention. In fact, the distance is estimated by means of phase difference measurements, and it is therefore desirable to reduce the extent of any noise acting upon the signal phase. One embodiment of the present invention uses a technique for correcting any errors caused by multiple propagation paths of the signal transmitted to the receiver.

In the case of OFDM signals for LTE networks, the band of the signal is much narrower than the radio frequency of the signal carrier (e.g. 5 MHz/800 MHz or 5 MHz/2 GHz). Therefore, it can be assumed that all the subcarriers of the reflected signal undergo the same phase displacement and the same attenuation, independently of subcarrier frequency.

In one example, the signal $s_c$ received by the receiver 102 can be expressed as a combination of two components, the first one relating to the signal 103 propagating without reflections, and the second one relating to the reflected signal 701. In general, the amplitude A of each component of the signal 103 must be considered to be normalized with respect to the amplitude of the direct signal 103 (i.e. $s_r$), received by the reception antenna.

The first component of the signal $s_c$ corresponds to the signal 103 received by the receiver 102 in the case of FIG. 1; the second component, added to the first one, takes into account the amplitude ratio α and the delay $t_r$ introduced into the signal 701 due to reflections. In particular:

$$s_c = \sin[2\pi f(t-t_d)] + \alpha \sin[2\pi f(t-t_d-t_R)]$$

where:
α is the ratio between the amplitude of the reflected signal 701 and the amplitude of the direct signal 103, $t_R$ [s] is the delay between the reflected signal 701 and the direct signal 103, and is given by the difference between the direct propagation path d and the reflected propagation path $d_R$ travelled at the speed of propagation c of electromagnetic waves in the air, i.e.:

$$t_R = (d_r - d)/c$$

Considering the signal $s_c$ received by the receiver 102, the distance d that separates the transmitter 101 from the receiver 102 can be estimated as a function of the phase difference between two tones as previously described, but it is also a function of the amplitude ratio α of the signal and of the delay of the reflected signal $t_R$.

Figure 8:
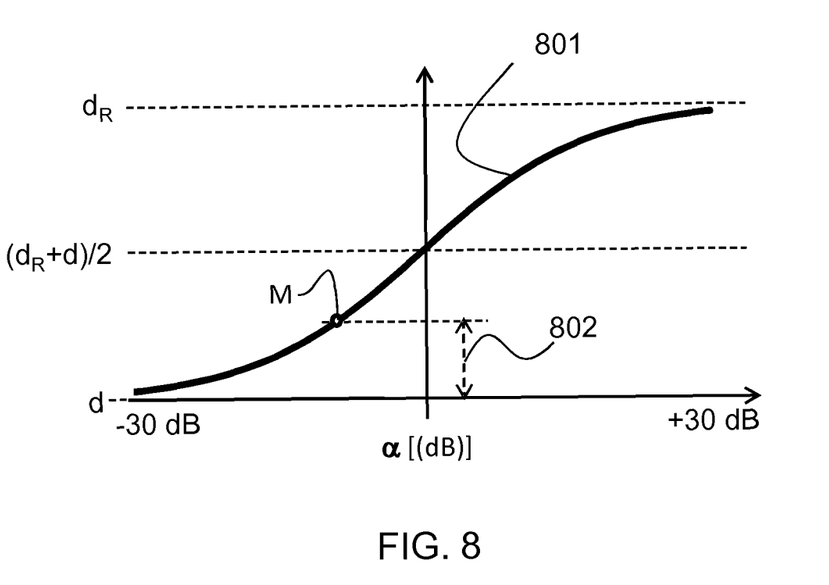
FIG. 8 exemplifies the relation between the actual distance between the receiver and the transmitter and the apparent distance in the presence of signal reflections.

FIG. 8 shows the trend 801 of the distance estimate obtained by assessing a phase difference between two subcarriers as a function of the amplitude ratio α. As shown in the drawing, if the amplitude of the reflected signal is much less than that of the direct signal (i.e. for small values of the amplitude ratio α), the estimated distance 801 will tend to coincide with the distance d between the receiver 102 and the transmitter 101. Conversely, if the amplitude of the reflected signal is much greater than that of the direct signal (i.e. if along the path of the direct signal there is an obstacle which introduces a strong attenuation, resulting in a high value of a), then the estimated distance 801 will tend to coincide with the length of the path $d_R$ of the signal 701.

Therefore, if one obtains a particular value M of the distance estimate 801 comprised between the direct distance d and the reflected distance $d_R$, knowing the values of the amplitude ratio α and of the difference between the propagation paths ($d_R$-d), one can apply a correction 802 to the distance M to bring it back to the length of the direct propagation path d.

For the purpose of equalizing the distortions of the radio channel, or of applying MIMO (Multiple Input Multiple Output) techniques, the receivers of cellular systems are equipped with algorithms that estimate the characteristics of the channel transfer function, from which it is possible to obtain, in real time, the parameters of functions like the one shown in the explanatory example of FIG. 8.

In the presence of only two propagation paths with respective lengths d and $d_R$, as in the example of FIG. 7, one can obtain the values of the amplitude ratio α and of the difference ($d_R$-d) as illustrated below.

Figure 9A:
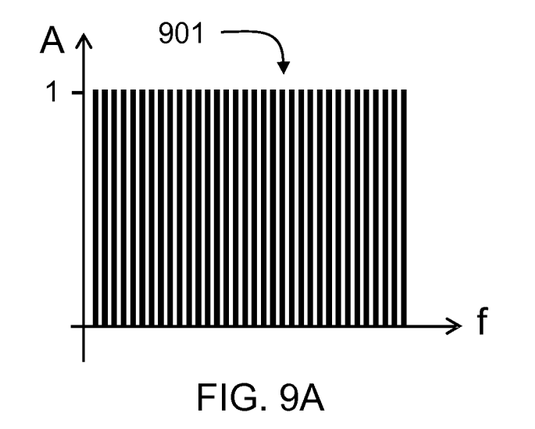
Figure 9B:
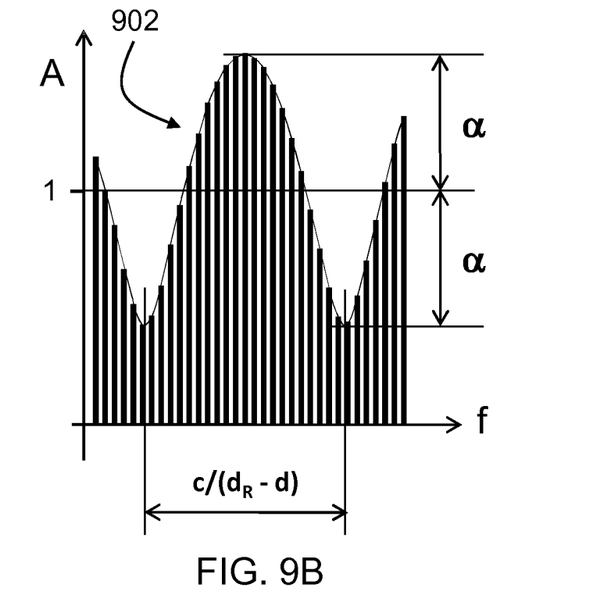
FIG. 9B shows a spectrum of a signal of an LTE cellular network received with distortions due to signal reflection.

FIG. 9A shows an example of a spectrum 901 of an undistorted OFDM signal, comprising a plurality of subcarriers schematized as vertical lines. Likewise, FIG. 9B shows a comparative example of a spectrum 902 of the same OFDM signal distorted by a multiple propagation path.

Depending on the frequency f, the amplitude A of the spectrum of the direct signal 901 is constant, whereas the spectrum of the distorted signal 902 shows a periodic trend of the amplitude A, with maximum and minimum values. In particular, also in this case reference is made to an amplitude A which is relatively normalized at the reference level of the direct signal as received by the reception antenna.

As a consequence of what has been described above, the peak-to-peak difference in the amplitude A of the signal 902 is exactly twice the module of the amplitude ratio α. This characteristic of the spectrum of the reflected signal 902 is due to the constructive or destructive interference between direct signal 103 and the reflected signal 701 along the signal path: in fact, some components get in phase with each other at particular frequencies, thus adding together their amplitudes, while other components get in phase opposition at other frequencies, so that their amplitudes are subtracted from each other.

The periodicity interval of the distortion of the signal 902 corresponds to those frequency intervals in which a full phase rotation by 360° occurs, which is given by the reciprocal of the delay $t_R$ between the direct signal and the reflected signal, i.e. $c/(d_r-d)$.

In order to establish if the amplitude of the reflected signal is greater or smaller than that of the direct signal, i.e. if the value of the amplitude ratio α (expressed in decibels) to be used in the example of FIG. 8 is positive or negative, one can consider the variation in the phase difference between constantly spaced tone pairs of different subcarriers. In the case of OFDM signals, it is possible to use tone pairs having a certain frequency spacing chosen among the most appropriate spacings for the particular condition under examination, and to mediate between measurements taken with different spacings. In particular, one may choose 90 kHz tone spacings, which allow using the reference subcarriers of the LTE signal, which are precisely spaced by 90 kHz.

Figure 10:
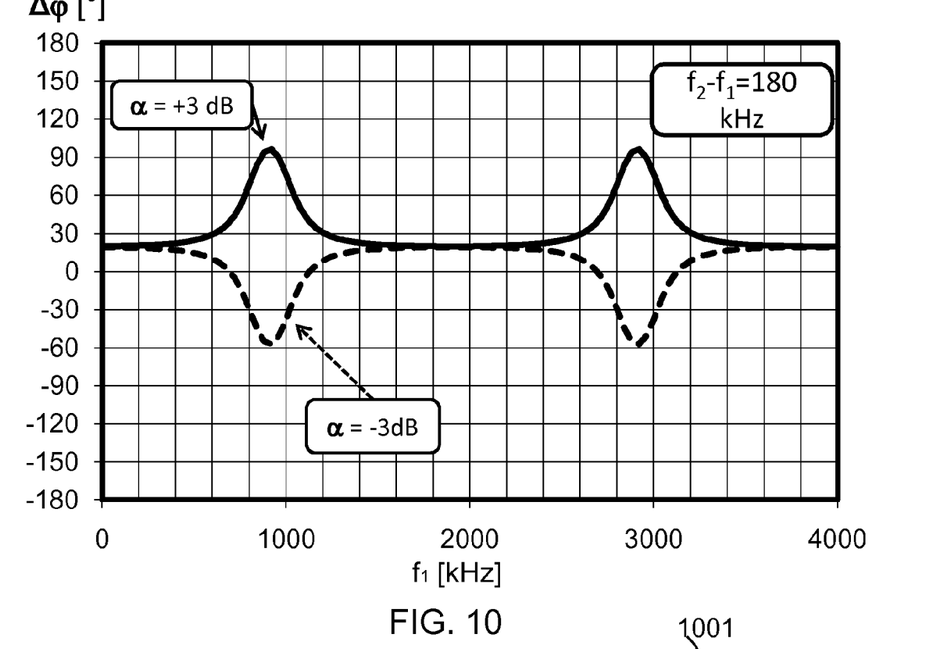
FIG. 10 shows the theoretical trend of a phase difference between the tones of two LTE subcarriers at different frequencies spaced by 180 kHz as the frequency of the lower subcarrier changes, in the case of a signal of an LTE cellular network received with distortions due to signal reflection, for an amplitude ratio of ±3 dB between the direct signal and the signal received through reflection.

FIG. 10 shows a numerical example of a trend of the phase differences Δϕ of a generic pair of tones having two frequencies, in particular $f_2$ greater than $f_1$. The trend of the phase differences Δϕ is shown as a function of the frequency $f_1$ of the lower subcarrier (variable between 0 and 4000 kHz).

This example considers a distance d of 1 km between the receiver and the transmitter, a reflected propagation path $d_R$ longer by 150 m than the direct one d, and a frequency spacing $(f_2-f_1)$ of 180 kHz between the subcarriers.

The presence of the second propagation path of the reflected signal 701 determines a periodic trend of the phase differences Δϕ between the tone pairs. This trend shows maximum values above the reference level, when the amplitude ratio α of the signal, expressed in decibels, is positive. Conversely, when the trend shows minimum values below the reference level, the amplitude ratio α, expressed in decibels, is negative. It is thus apparent that, by measuring phase differences between a plurality of subcarrier pairs different from one another but having constant spacing, one can determine the sign of the amplitude ratio α, expressed in decibels.

Furthermore, it can be observed that the periodicity interval of the phase differences Δϕ as a function of frequency, which in the example of FIG. 10 is 2 MHz, corresponds to the ratio between the speed of propagation c of the electromagnetic wave and the difference in the length of the two propagation paths (150 m), i.e. to the reciprocal of the delay $t_R$, as previously described.

Therefore, one can obtain the difference between the lengths of the two propagation paths (direct and reflected) also from the measurements exemplified in FIG. 10, just as for the case of FIG. 9. Moreover, the peak-to-peak ranges of the curves of FIG. 10 also depend on the amplitude ratio α, so that from these exemplified measurements it is possible to obtain all the parameters useful for finding, in FIG. 8, the correction 802 to be made to the apparent distance M in order to determine the length of the direct propagation path d. In conclusion, several alternative methods are available for calculating the correction to be made to the apparent distance M, and one can therefore mediate between different methods.

The method for estimating the distance from a receiver to a transmitter described so far is preferably applied to the case of LTE cellular networks.

LTE cellular networks use a cellular mobile terminal, also called user apparatus, which communicates via radio waves with one or more radio base stations scattered over the territory, which broadcast signals within so-called radio coverage "cells".

It is clear that, even in the same LTE cellular network, the present invention is applicable to both cases wherein the mobile terminal transmits a signal that is received by a base station and wherein a base station transmits a signal that is received by the mobile terminal.

It is however particularly advantageous to use the present invention for estimating the distance of a mobile terminal acting as a receiver of signals transmitted by a plurality of base stations, in particular by at least three base stations. In this manner, by estimating the relative distances from base stations whose position is known, for example, from a suitable localization database, the mobile terminal can calculate the coordinates of its own geographic position by means of trilaterations or multilaterations. In particular, the terminal can determine its own position by receiving signals transmitted by the base stations, without in its turn having to transmit signals sufficiently powerful to be received by multiple base stations more or less far away, resulting in a reduction of the electric power used by the terminal for localization purposes.

Figure 11:
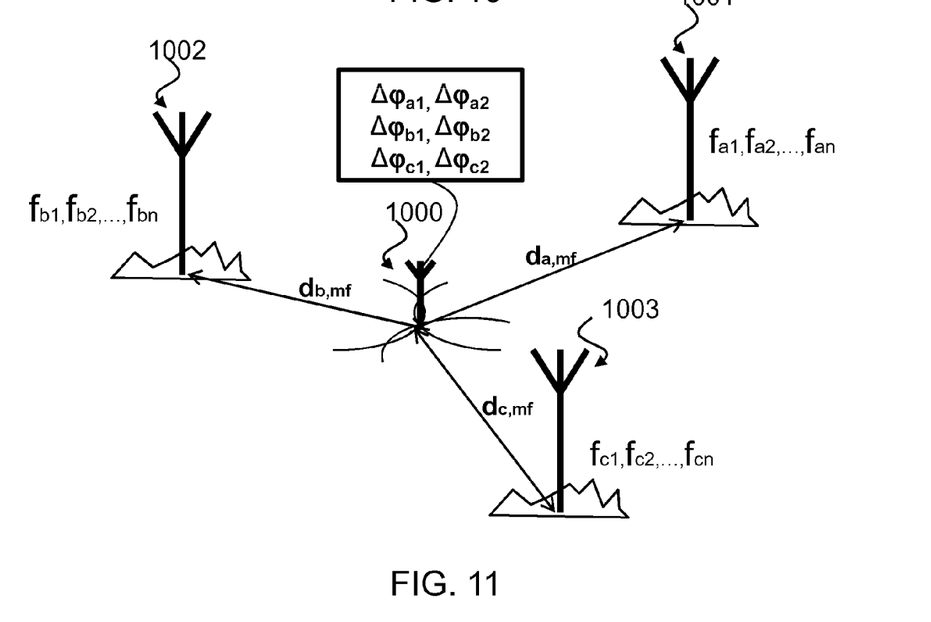
FIG. 11 exemplifies one embodiment of the method for calculating the position of a mobile terminal in a cellular network according to the present invention. The drawings show different aspects and embodiments of the present invention and, where appropriate, similar structures, components, materials and/or elements in the various drawings are designated by the same reference numerals.

FIG. 11 shows one embodiment of a method for estimating the position of a mobile terminal according to the present invention, exemplified in combination with a cellular network, preferably of the LTE type.

The mobile terminal 1000, e.g. an LTE cellular telephone, receives radio signals from a plurality of base stations 1001, 1002, 1003. Preferably, the mobile terminal 1000 comprises at least one antenna for receiving radio signals from a plurality of base stations (1001,1002,1003), means for extracting at least two tones from each one of said radio signals simultaneously received from each one of said base stations, and means for measuring phase differences between said at least two tones at given time instants.

The base station 1001 transmits at least one signal, from which a plurality of tones can be extracted, each having a different frequency, e.g. $f_{a1}$, $f_{a2}$, $f_{a3}$, etc., up to the "n-th" frequency $f_{an}$. These tones are preferably extracted from subcarriers of an OFDM signal. Likewise, the base station 1002 transmits at least one signal from which one can extract a plurality of tones having different frequencies $f_{b1}$, $f_{b2}$, $f_{b3}$, up to $f_{bn}$; while the first base station 1003 transmits at least one signal from which one can extract a plurality of tones having different frequencies $f_{c1}$, $f_{c2}$, $f_{c3}$, up to $f_{cn}$.

The mobile terminal 1000 receives the signals coming from the base stations 1001, 1002 and 1003; in particular, the terminal 1000 comprises a device, e.g. a processor, adapted to analyze the received signals, to select and extract the necessary tones, and to measure phase differences between said tones. According to the invention, it is not necessary that all the base stations 1001, 1002, 1003 belong to the same network operator, but simply that they transmit a signal from which the receiver 1000 can extract a plurality of tones. In particular, it is not necessary that the terminal 1000 is connected (i.e. establishes a bidirectional communication) to each one of the base stations 1001, 1002, 1003, since it is sufficient that the terminal 1000 receives the above-mentioned signals.

The mobile terminal 1000 is adapted to measure a first phase difference $\Delta\phi_{a1}$ between a first pair of tones of the signal transmitted by the base station 1001, and to also measure a second phase difference $\Delta\phi_{a2}$ between a second pair of tones of the signal transmitted by the base station 1001, having a frequency spacing greater than that of the tones used for measuring $\Delta\phi_{a1}$, as previously described. The distance $d_{a,mf}$ between the base station 1001 and the mobile receiver 1000 is thus estimated in accordance with the above-described method. In particular, in the preferred embodiment the calculations necessary per estimating the distance are made directly at the level of the mobile terminal 1000, without any further communications with external devices or with the base stations themselves. Likewise, the mobile terminal 1000 is adapted to measure two additional phase differences $\Delta\phi_{b1}$ and $\Delta\phi_{b2}$, each between a different pair of tones of the signal transmitted by the base station 1002 and differently spaced in frequency, as already described, in order to estimate the distance $d_{b,mf}$ between the base station 1002 and the mobile receiver 1000.

In addition, the mobile terminal 1000 is adapted to measure two additional phase differences $\Delta\phi_{c1}$ and $\Delta\phi_{c2}$, each between a different pair of tones of the signal transmitted by the base station 1003 and differently spaced in frequency, as already described, in order to estimate the distance $d_{c,mf}$ between the base station 1003 and the mobile receiver 1000.

Therefore, the mobile terminal 1000 is adapted to estimate the distances $d_{a,mf}$, $d_{b,mf}$ and from the base stations 1001, 1002 e 1003, respectively. The geographic position of each base station 1001, 1002 or 1003 can be made known to the mobile terminal 1000, e.g. by interrogating a database (whether locally or on a network), which associates the cell identifier with the geographic position of the transmitter, or through transmission of the geographic coordinates (such as latitude and longitude) directly within the signal being received. Of course, in the case involving the use of base stations, the geographic point relative to which the transmitter is considered to be located is the antenna of the base station, or more precisely the electromagnetic "focus" of the antenna (or of the antenna system), which ideally represents the point from which the transmitted electromagnetic waves spring out, or towards which the received electromagnetic waves converge.

In general, in order to calculate the position of the mobile terminal 1000 the method requires that the mobile terminal 1000 receives a plurality of signals 1001, 1002, 1003, each comprising components from which one can extract a plurality of tones at different frequencies $f_{a(1,\ldots,n)}$, $f_{b(1,\ldots,n)}$, $f_{c(1,\ldots,n)}$. The mobile terminal 1000 then measures a plurality of phase differences $\Delta\phi_{a1}$, $\Delta\phi_{a2}$, $\Delta\phi_{b1}$, $\Delta\phi_{b2}$, $\Delta\phi_{c1}$, $\Delta\phi_{c2}$ between at least two pairs of the plurality of tones received for each signal 1001, 1002 or 1003, so as to estimate the distances $d_{a,mf}$, $d_{a,mf}$, $d_{c,mf}$.

In this way, the terminal 1000 can calculate its own geographic position, e.g. by trilateration, based on the distances $d_{a,mf}$, $d_{b,mf}$, $d_{c,mf}$ estimated in accordance with the method of the present invention. The mobile terminal 1000 can estimate its own position with an accuracy comparable to those of satellite systems, and with coverages comparable to those of the cellular network.

Furthermore, since the terminal 1000 only receives signals without necessarily transmitting any, it is possible to calculate the distance of a radio mobile terminal from a base station to which it is actually connected or from a base station from which it simply receives a signal (without being connected thereto). This advantageously increases the chances of attaining a successful localization of the terminal.

In general, the distances $d_{a,mf}$, $d_{b,mf}$ and $d_{c,mf}$ are estimated with an accuracy that may be known to the terminal 1000. In particular, the distances may be overestimated because of the presence of multiple propagation paths, as previously described. In this case, instead of defining an exact point of localization of the terminal 1000, one estimates an area within which the terminal 1000 is probably located.

For improved accuracy when estimating the location of the terminal 1000, one can estimate the distance of the mobile terminal from a number of base stations greater than three, e.g. four, five or more, i.e. by multilateration. One can also improve the determination of the position thus calculated by associating different weights with the estimated distances, for example based on the following factors:

ratio between the measured attenuation of each signal and the theoretical attenuation in free space (any attenuation greater than attenuation in free space indicates the presence of reflections, and gives less weight to the corresponding estimated distance);

extent of any distortions introduced in the radio channel, which are deduced from the estimate of the channel transfer function made by the receiver 1000 (greater distortions give less weight to the corresponding estimated distance);

level of the signal component coming from the unreflected propagation path with respect to that of other reflected components of the signal (a higher level of the unreflected signal gives more weight to the corresponding estimated distance); this level is assessed by considering the delay of at least one subcarrier of the signal.

In an alternative embodiment, the terminal 1000 sends to the network the values of the estimated distances, and entrusts the trilateration operations to the network itself, receiving from the latter the information about its own position (e.g. via SMS or another communication protocol).

In another embodiment, after having calculated its own position, the mobile terminal 1000 transmits it to an external device, in particular to a base station, more in particular to one of the three base stations 1001, 1002 or 1003.

In a different embodiment, the method for calculating the position of a mobile terminal is implemented at base station level, through a device for locating mobile terminals operationally connected to at least one base station. The base stations 1001, 1002, 1003 measure the phase differences between tones extracted from a signal transmitted by the mobile terminal itself (e.g. a cellular telephone, which in this case acts as a transmitter) and received by the base stations. In this case, trilateration is entrusted to the base stations, and can be used, for example, for locating a mobile terminal in emergency situations. In this case as well, the base stations receive a signal transmitted by the mobile terminal 1000, said transmitted signal comprising components from which one can extract a plurality of tones at different frequencies, and each one of the base stations 1001, 1002, 1003 measures at least two phase differences between at least two tone pairs, so as to estimate the distances $d_{a,mf}$, $d_{b,mf}$, $d_{c,mf}$. In cellular networks, the mobile terminal 1000 usually irradiates a signal intended exclusively for the base station with which it is affiliated. Therefore, in a preferred embodiment the terminal 1000, for the purpose of supplying localization signals, sends a train of direct signals to at least three base stations 1001, 1002 and 1003 within its range. This train of signals comprises, at successive instants, distinct signals addressed by the terminal 1000 to each one of the base stations 1001, 1002 or 1003, from each of which signals the respective station can extract a plurality of tones and measure the respective phase differences, which are necessary for estimating the distance, as previously described.

In a less advantageous alternative embodiment, it is nevertheless conceivable that a signal emitted by the terminal 1000 is simultaneously received by all the base stations 1001, 1002 and 1003, provided that the signal has such characteristics that allow it to be correctly received, and that the base stations can be synchronized and re-tuned for receiving such dedicated signal.

Yet another embodiment can be conceived if the mobile terminal can use a second localization system, e.g. a GPS satellite system. In such a case, the present method can be used for determining the movement of the terminal from the last point located by the GPS system. To this end, in concomitance with the localizations carried out by using the GPS system, the mobile terminal determines, in accordance with the present method, the distances at which it is located from the received base stations, and stores such distances together with the parameters of the respective multiple propagation paths and with the position provided by the GPS system.

If one wants to use the method of the present invention instead of the GPS system, e.g. due to the absence of a valid GPS signal, the terminal determines the distances from the base stations with the present method, and then, if the difference from the position contained in the stored data is within a predetermined interval, it corrects the estimated position by processing the stored data and the newly estimated distances.

The method for estimating the distance between a transmitter and a receiver according to the present invention offers short response times and coverage comparable to those of the radio systems it relies on, and allows estimating distances with intrinsic accuracies comparable to those of satellite systems, as well as to limit any errors caused by the presence of multiple propagation paths.

The present method is preferably and advantageously applied to mobile terminals belonging to transceiving systems using OFDM modulation, such as, for example, cellular networks compliant with the Long Term Evolution (LTE) standard and systems based on the IEEE 802.16 (WiMax) standard. In this case, the present method can advantageously be employed not only for estimating the distance, but also for calculating the position of the mobile terminal through multilateration of distances from base stations.

The method achieves accuracies comparable to those offered by satellite systems and coverage comparable to those of the transceiving systems to which it is applied.

The features and advantages of the present invention are apparent from the description of the above-mentioned embodiments thereof, the protection scope of the invention being defined by the appended claims. It is clear that a man skilled in the art may make several changes and variations to the above-described methods and systems.

It is also clear that, although the method of the present invention has been described herein with particular reference to estimating the distance between a receiver and a transmitter belonging to an LTE (Long-Term Evolution) cellular telecommunication system as standardized by international organization 3GPP ($3^{rd}$ Generation Partnership Project), it is likewise applicable to other systems which, just like LTE, use OFDM modulation, such as WiMax (Worldwide Interoperability for Microwave Access), standardized within the sphere of IEEE 802.16 (Institute of Electrical and Electronics Engineers, Working Group on Broadband Wireless Access Standards-Wireless Metropolitan Area Network), DVB-T (Digital Video Broadcasting-Terrestrial), DVB-H (Digital Video Broadcasting-Handheld) and other similar systems, whether OFDM or not, which utilize radio signals from which receivers can extract multiple tones spaced at discrete frequencies.

More in general, it must be underlined that the present method is applicable to signals that simultaneously contain a different number of tones, provided that at any instant they contain at least two tones whose phase difference can be measured, if the frequency spacing between such tones changes over time, in particular increases or decreases by a quantity suitable for implementation of the present method.

A first example of this type of signals is a signal comprising three tones between which one can take three measurements of phase differences between pairs of tones having different frequency spacings. By modifying at successive instants the spacings between the three tones, one can take measurements between tones having many different spacings.

A second example is a signal comprising two tones with adjustable frequency spacing, so that one can measure the difference between the phases of the two tones with a certain spacing, and afterwards take measurements with different spacings. In particular, the spacing between the tones is preferably at least tripled in time.

A third example is given by the use of a single tone that changes frequency in time according to a predetermined law, so as to allow phase measurements at different frequencies at time instants which are close enough that they can be considered simultaneous for using the measurement. In this case, measurements taken at different times can be considered to be taken simultaneously and can be processed as described in the preceding examples.

In general, a transmitter may be a radio transmission system, even a very complex one, in diversified forms. For example, one may use three distinct transmitters for each tone, appropriately synchronized and located in the same place.

In general, such a radio transmission system comprises a transmitter adapted to irradiate, whether simultaneously or sequentially, radio signals from which at least three tones at different frequencies can be extracted.

In all the other examples presented herein, one can apply corrections to errors caused by multiple propagation paths, determining channel-induced distortions by storing measurements taken at different frequencies or measurements taken by scanning the channel over a sufficiently broad band.

However, the use of the method described herein without correcting the errors induced by multiple propagation paths allows estimating the length of the apparent propagation path of the reflected signal. The apparent propagation path is directly related to the time required by the radio signal to travel the path from the transmitter to the receiver. The present method may therefore be advantageously used for determining the actual travel time and to know a priori the extent of the advance at which the terminals of OFDMA (Orthogonal Frequency Division Multiple Access) systems must emit their signals for such signals to arrive at the base station with which they want to affiliate, or with which they are affiliated, within a preset time window. By applying the method of the present invention, in fact, it is possible to simplify the procedures of affiliation of terminals to base stations and to lighten the burden on the control mechanisms through which transceiving systems compensate for propagation delays, which are correlated with the apparent distance estimated in accordance with the present method.

The invention claimed is:

1. A method for estimating a distance of a mobile terminal comprising a radio receiver, from at least one base station comprising a radio transmitter, comprising the steps of:
   receiving, at said radio receiver, radio signals irradiated by said radio transmitter, said radio signals corresponding to an OFDM signal comprising a plurality of subcarriers from which a plurality of corresponding tones is extractable;
   extracting from said subcarriers of said OFDM signal at least three tones, each having a different frequency;
   measuring a first phase difference between a first two tones of said at least three tones, whose frequencies have a first spacing, and measuring a second phase difference between a second two tones of said at least three tones, whose frequencies have a second spacing, wherein one of said first spacing or second spacing is greater than the other;
   estimating said distance on a basis of said first phase difference and said second phase difference; and correcting the estimated distance based on characteristics of a transfer function of a radio channel that includes the OFDM signal, the transfer function being related to a periodicity interval of a distortion present in a frequency spectrum of the radio channel, said distortion characterizing the signal path which separates said base station from said radio receiver.

2. A method according to claim 1, wherein said distance is estimated by comparing a first estimate of said distance based on said first phase difference with at least a second estimate of said distance based on said second phase difference.

3. A method according to claim 1, wherein said subcarriers are equally spaced in frequency, and wherein the smaller one of said first spacing and second spacing is equal to the spacing between said plurality of subcarriers.

4. A method according to claim 1, wherein said two tones whose frequencies have said greater spacing are selected depending on an uncertainty associated with said phase difference measured between said two tones whose frequencies have said smaller spacing.

5. A method according to claim 1, further comprising correcting the estimated distance by accounting for a difference between an estimated distance and the length of the direct propagation path of said radio signals, in the radio channel.

6. A mobile terminal comprising:
   at least one antenna and a radio receiver for receiving OFDM radio signals,
   a radio signal processor configured for extracting tones from corresponding subcarriers of said received OFDM radio signals, and further configured for measuring phase differences between said tones,
   wherein said mobile terminal is configured for estimating the distance from at least one base station comprising a radio transmitter by the steps of the method according to claim 1.

7. A method for calculating a position of a mobile terminal receiving OFDM radio signals from a plurality of base stations whose geographic positions are known, the method comprising the steps of:
   receiving OFDM signals at said mobile terminal, said OFDM signals transmitted from at least three base stations included in said plurality of base stations;
   estimating a relative distances between said mobile terminal and each one of said at least three base stations, by the steps of the method for estimating the distance according to claim 1, wherein said mobile terminal acts as said radio receiver and each one of said base stations acts as said radio transmitter;
   calculating the position of said mobile terminal by multilateration with respect to said at least three base stations.

8. A method according to claim 7, wherein when calculating said position a weight is associated with each one of said estimated relative distances, said weight being a function of at least one of the following parameters: signal attenuation, signal distortion, and delay of at least one subcarrier of the signal.

9. A mobile terminal comprising:
   at least one antenna and a radio receiver for receiving radio OFDM signals from at least three base stations,
   a radio signal processor configured for extracting tones from corresponding subcarriers of said received OFDM radio signals, and further configured for measuring phase differences between said tones,
   wherein said mobile terminal is configured for calculating the position by the steps of the method according to claim 7.

* * * * *